May 19, 1970  W. H. STANGE  3,512,827
COMBINATION TABLE-SEAT FOR MOTOR HOMES
Filed June 2, 1969  2 Sheets-Sheet 1

INVENTOR.
WILFRED H. STANGE
BY
*John M Winters*
ATTORNEY

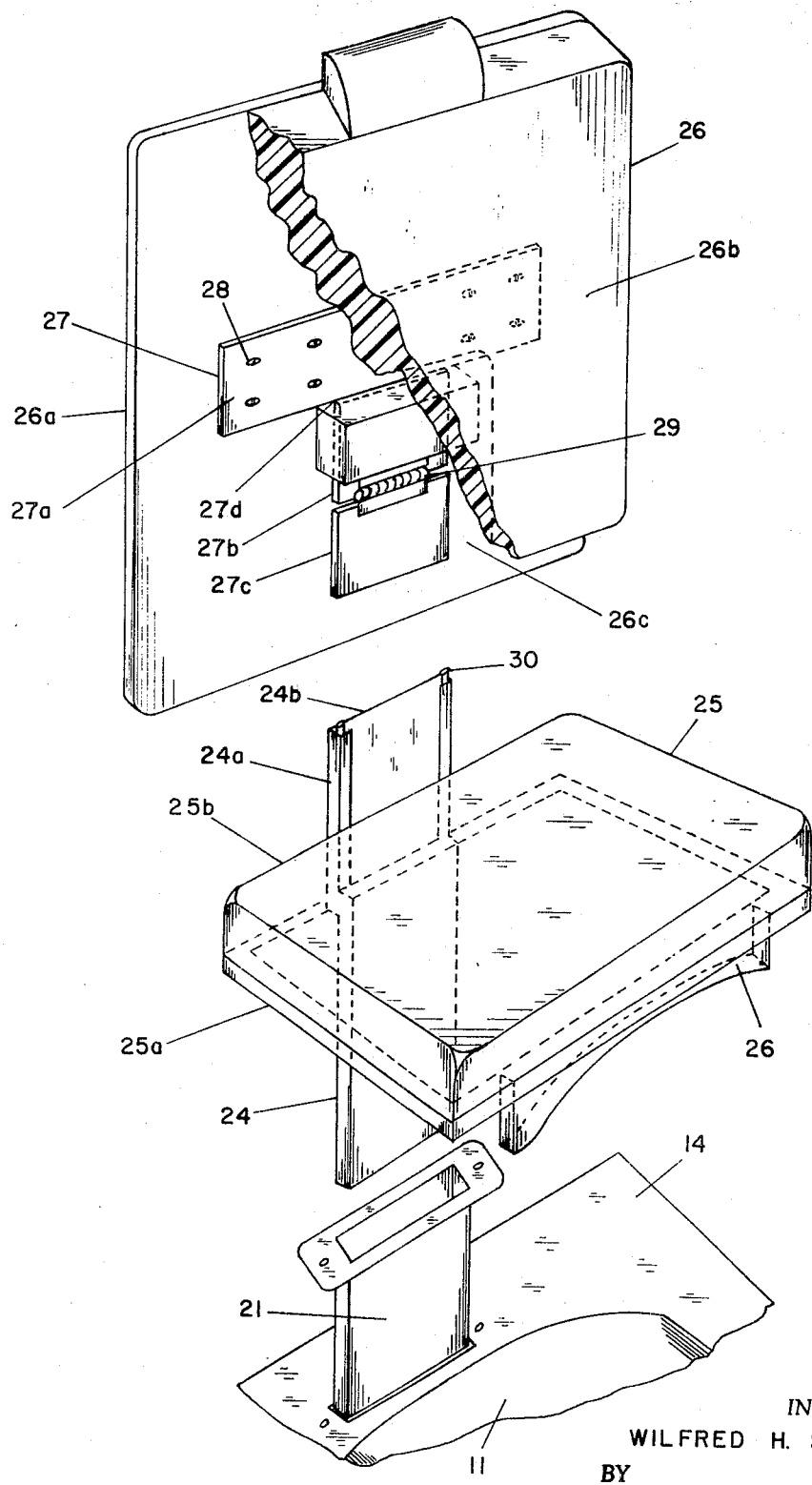

United States Patent Office 3,512,827
Patented May 19, 1970

---

3,512,827
COMBINATION TABLE-SEAT FOR MOTOR HOMES
Wilfred H. Stange, Rte. 2, Box 206,
New Lisbon, Wis. 53950
Filed June 2, 1969, Ser. No. 829,360
Int. Cl. B60n 1/10
U.S. Cl. 296—64                    2 Claims

ABSTRACT OF THE DISCLOSURE

A combination table-set unit mounted over the engine housing of a motor home. The unit has a seat portion extending forwardly from a vertical frame removably supported in a well installed in the floor of the motor home adjacent the rear of the engine housing. The back portion of the seat has a hinged mounting member inserted in the frame for maintaining the back portion in an upright "chair" position and pivoting it to a horizontal "table" position in which it rests on the seat portion.

BACKGROUND OF THE INVENTION

Field of the invention

My invention relates to a removable combination table-seat unit extending over the raised engine housing between the front seats of a motor home.

Description of the prior art

In recent years, the United States has become an increasingly mobile society. Homes on wheels or house trailers have, of course, been common for many years, but lately self-propelled units generally called "motor homes" or "house vans" have become increasingly popular for such things as hunting, fishing and skiing trips, family vacations, and all other types of recreational uses. Many firms are also finding them economical and convenient for various types of business travel and for field offices as well.

Several manufacturers have developed their own models of motor homes, but with few minor differences in selling features and internal arrangements, their designs are quite similar in most respects. For instance, in most motor homes the cab extends out over the engine and the driver's and front passenger's seats are positioned alongside of the engine over the front wheels. The engine is covered by a raised housing generally semi-cylindrical or rectangular and extending longitudinally between the front seats. The engine housing is removable for access to the engine for maintenance.

This positioning of the engine and the raised engine housing result in a major problem of wasted space. Since any mobile home is designed to be sold on the concept of usable space, this wasted space is a problem of concern both to the manufacturer and the customer.

Another design shortcoming of the present motor homes is that while the home may be designed to sleep six or more persons, the dining table and seating arrangement therefor is only designed for four persons. This inbalance in sleeping and eating facilities simply magnifies the problem of unused space above the engine housing.

To my knowledge, no manufacturer has designed a motor home wherein the eating facilities are commensurate with the sleeping facilities, nor has any manufacturer offered a practical solution for utilizing the wasted space posed by the raised motor housing between the front seats.

SUMMARY OF THE INVENTION

My combination table-seat offers a practical answer to the unused space problem presented by the motor housing and to the lack of dining space in motor homes. The combination table-seat unit converts the wasted space over the engine housing to a dual functional area. As a seat, it permits an additional person to ride comfortably and safely to enjoy the view from the front of the motor home. As a table, it allows two additional persons to eat at the same time that the rest of the occupants of the motor home are eating at the regular dining table.

The combinaion table-seat unit has a seat portion extending forwardly from a vertical rigid frame removably supported in a well installed in the floor of the motor home adjacent the rear of the raised engine housing. The back portion of the seat is attached to an articulated mounting member which is inserted in the upright rigid frame for releasably securing the back portion in upright "chair" position and for pivoting it to a horizontal "table" position in which it rests on the seat portion.

The table-seat unit can be removed in a few seconds when it is necessary to gain access to the engine for maintenance by merely withdrawing the upright rigid frame from the floor well. When the unit is not in use it can be removed, leaving only the well which is substantially flush with the floor of the motor home.

My invention is also important from a safety standpoint since it is desirable to have as many passengers in belted seats as possible when the vehicle is moving. Accordingly, my invention provides a safe seat for an additional adult or two children during highway travel in the vehicle and prevents them from being thrown about and possibly seriously injured should they be standing or sitting somewhere else in the vehicle should the driver find it necessary to make a sudden emergency stop or upon collision.

My combination table-seat unit is an important advance in motor homes from both the safety standpoint and space utilization design.

Further objects, features and advantages of my invention will be apparent from the following detailed description taken in conjunction with the accompanying drawings showing a preferred embodiment of the invention for exemplification.

BRIEF DESCRIPTION OF THE DRAWINGS

FIG. 3 is an exploded frontal perspective view of my combination table-seat unit for motor homes with a portion of the back cushion broken away to show the mounting member thereof.

DESCRIPTION OF THE PREFERRED EMBODIMENT

Referring now more particularly to the drawings wherein like numerals refer to like parts throughout the several views, my combination table-seat unit is generally indicated by numeral 20.

Figure 1:
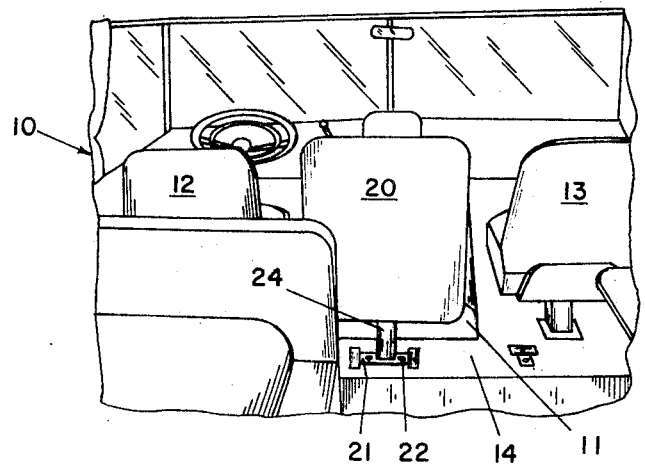
FIG. 1 is a rear view of my combination table-seat unit mounted in a motor home in upright "seat" position.
Figure 2:
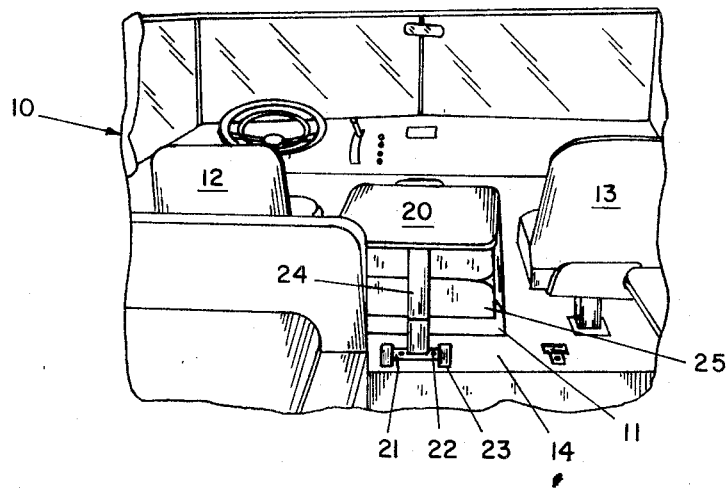
FIG. 2 is a rear view similar to FIG. 1 except that the combination table-seat unit is shown in its horizontal or "table" position.

As shown in FIGS. 1 and 2, in order to provide an additional passenger seat at the front of a conventional motor home 10 and a table for the driver's and front passenger's seats 12 and 13, I have designed the combination table-seat unit 20 for installation in the previously unused space over the raised engine housing 11 of the motor home. The seats 12 and 13 are pivotable 180° from front to back.

A rectangular steel floor well 21 is installed in the floor 14 of the motor home adjacent the rear of the raised engine housing 11. The well is rigidly secured to the floor of the motor home by bolts 22. The well is unobstructive in that it is substantially flush with the floor. A seat belt 23 is also secured to the floor by bolts 22.

As best shown in FIG. 3, an upright steel frame 24 supporting a forwardly extending seat portion 25 is designed to fit into the well 21. The seat portion 25 has a rigid base 25a and a cushion 25b mounted on the base.

A support bracket 26 shaped to fit over the raised engine housing 11 may be provided on the underside of base 25a to engage the top of the engine housing for additional support if desired.

The upright steel frame 24 has an upper channel portion 24a extending above the seat cushion 25b. The back portion 26 of the combination table-seat unit comprises a flat rigid base 26a and a back cushion 26b mounted on said base. As best shown in FIG. 3, the channel portion 24a of frame 24 extends above the seat cushion a distance about the thickness of the back cushion and the base 26a of back portion 26 may extend somewhat below the bottom edge of the back cushion depending upon the table size desired.

A T-shaped metal mounting plate 27 is rigidly secured by screws 28 to the base 26a between the base and back cushion 26b. The mounting plate has a cross-member 27a and an upper stem segment 27b and a hinged lower stem segment 27c depending from the upper stem segment. The stem segments of plate 27 are spaced slightly from the front face of the base 26a so that they can be inserted into the channel portion 24a of the rigid frame. The stem segments of the T-shaped plate drop into the frame channel 24a until the shoulder 27d provided at the juncture of the upper stem segment 27b and the cross-member 27a comes to rest on the top edge 24b of the channel.

The back cushion 26b has a rectangular opening 26c on its backside as shown in FIG. 3 for receiving the channel portion 24a therein.

When both stem segments 27b and 27c of the T-shaped mounting plate 27 are positioned in the channel 24a, the back portion 26 of the unit is rigidly supported in its upright "chair" position as shown in FIG. 1.

To place the back portion 26 in its horizontal "table" position as shown in FIG. 2, the back portion is raised until the hinge 29 clears the top edge 24b of channel 24a leaving the hinged lower stem segment 27c in the channel. The back portion may then be pivoted forwardly to a horizontal position on top of the seat cushion 25b to provide a table for the driver and front passenger.

Adjusting pins 30 may be provided, if desired, for leveling the table.

It is understood that the present invention is not confined to the particular construction and arrangement of parts herein illustrated and described, but embraces all such modified forms thereof as come within the scope of the following claims.

I claim:

1. In a motor home having an engine housing on the floor between a pair of individual pivotal driver's and front passenger's seats, a combination table-seat comprising:
  (a) rigid support means on the floor of the motor home adjacent the engine housing,
  (b) an upright rigid frame removably mounted on said support means,
  (c) a seat portion substantially horizontally supported on said frame over the engine housing, and
  (d) a back portion having an articulated member mounted on said upright rigid frame for releasably maintaining said back portion in said substantially upright position on said frame to provide a back for said seat portion and pivoting same into a horizontal position over said seat portion to provide a table.

2. The combination table-seat specified in claim 1, wherein said articulated member is slideably mounted on said upright rigid frame for movement between a lower position releasably maintaining said back portion in said substantially upright position and an upper position for pivoting same into said horizontal position.

References Cited

UNITED STATES PATENTS

| | | | |
|---|---|---|---|
| 1,397,675 | 11/1921 | Buske | 297—378 X |
| 2,192,207 | 3/1940 | Stahl | 296—64 |
| 3,254,915 | 6/1966 | Mahaffey | 297—125 |
| 3,336,077 | 8/1967 | Radke et al. | 297—232 X |
| 3,340,547 | 9/1967 | Welti | 297—232 X |
| 3,391,960 | 7/1968 | Megargle et al. | 296—24 |

LEO FRIAGLIA, Primary Examiner

J. A. PEKAR, Assistant Examiner

U.S. Cl. X.R.

180—89; 297—232, 378